July 5, 1932.   M. FRISCH ET AL   1,866,404
FINELY DIVIDED FUEL BURNING FURNACE
Filed Jan. 3, 1929   5 Sheets-Sheet 1
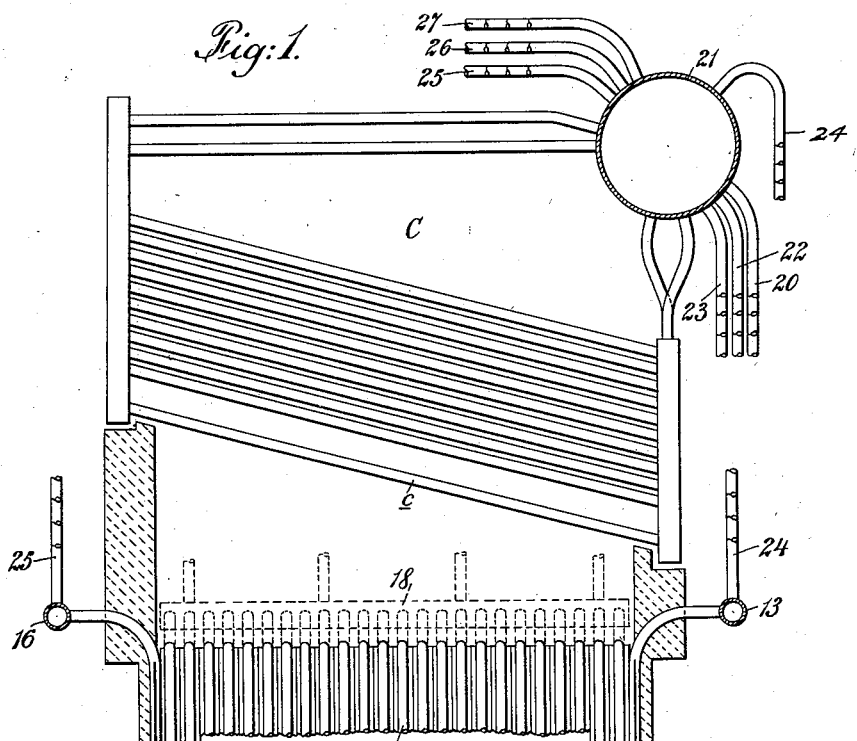
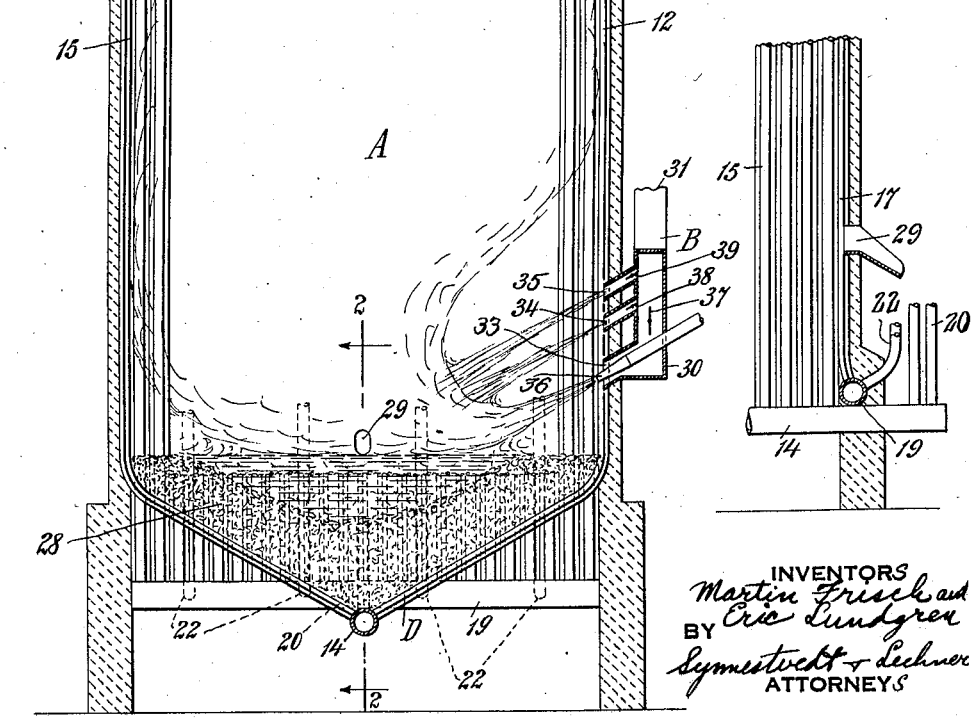

July 5, 1932.  M. FRISCH ET AL  1,866,404
FINELY DIVIDED FUEL BURNING FURNACE
Filed Jan. 3, 1929   5 Sheets-Sheet 2
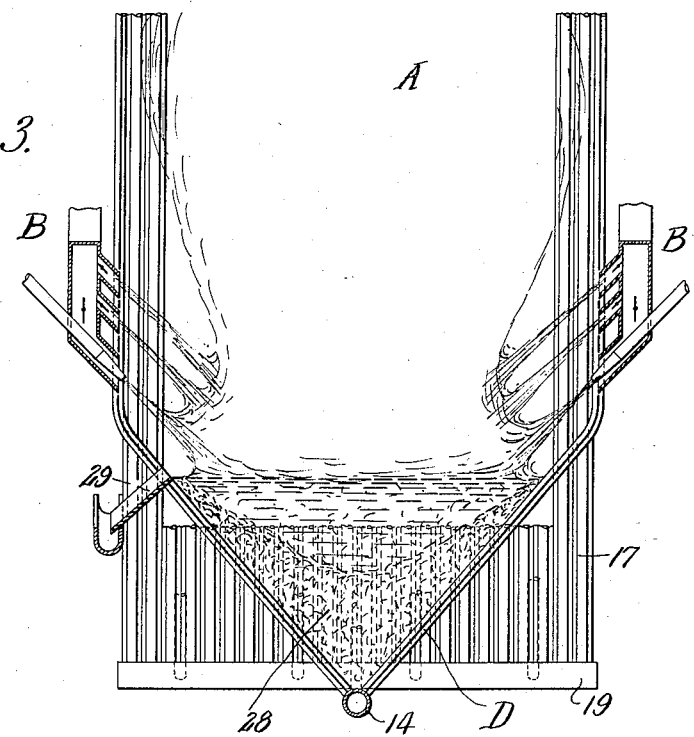
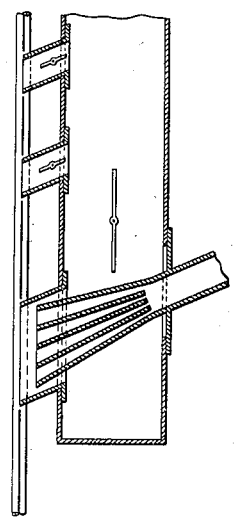
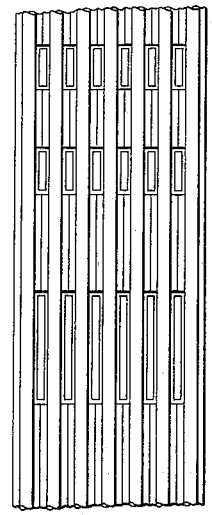
INVENTORS
Martin Frisch and
Eric Lundgren
BY
Synnestvedt & Lechner
ATTORNEYS July 5, 1932.  M. FRISCH ET AL  1,866,404
FINELY DIVIDED FUEL BURNING FURNACE
Filed Jan. 3, 1929   5 Sheets-Sheet 3
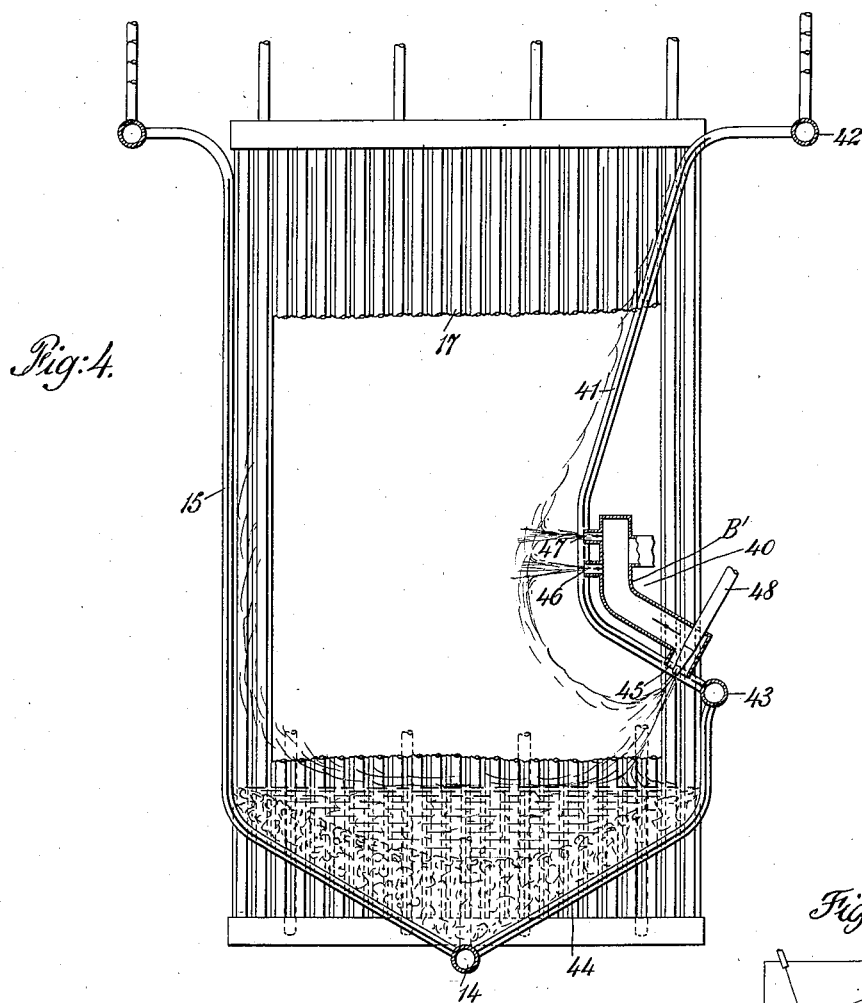
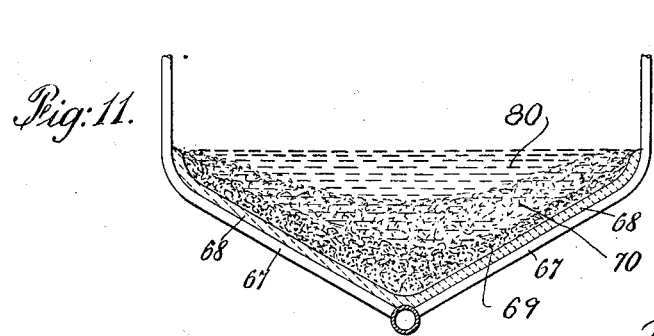
INVENTORS
Martin Frisch and
Eric Lundgren
BY
Synnestvedt & Lechner
ATTORNEYS July 5, 1932.  M. FRISCH ET AL  1,866,404
FINELY DIVIDED FUEL BURNING FURNACE
Filed Jan. 3, 1929    5 Sheets-Sheet 4
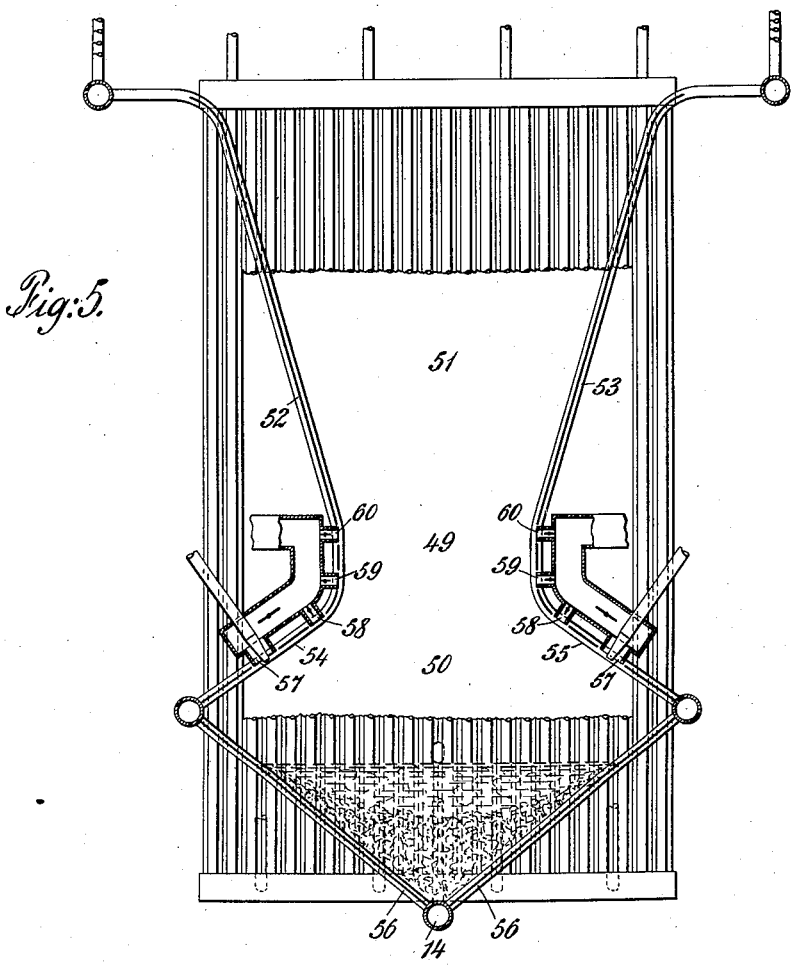
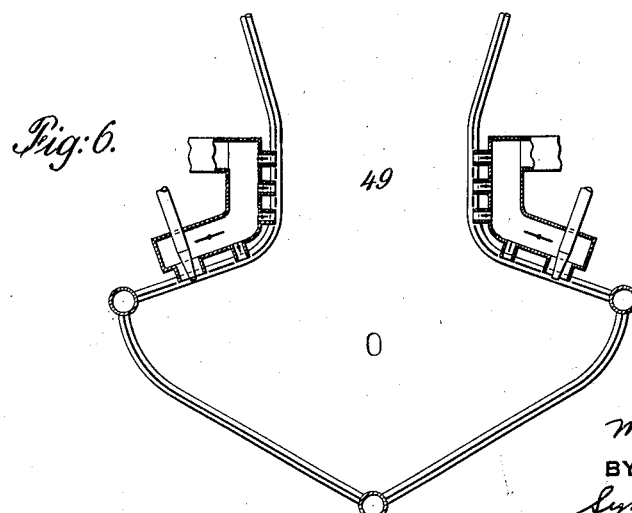

July 5, 1932.  M. FRISCH ET AL  1,866,404
FINELY DIVIDED FUEL BURNING FURNACE
Filed Jan. 3, 1929  5 Sheets-Sheet 5

INVENTORS
Martin Frisch and
Eric Lundgren
BY
Symmestvedt & Lechner
ATTORNEYS

Patented July 5, 1932

1,866,404

UNITED STATES PATENT OFFICE

MARTIN FRISCH, OF NEW YORK, N. Y., AND ERIC LUNDGREN, OF FREDERICK, MARYLAND, ASSIGNORS TO INTERNATIONAL COMBUSTION ENGINEERING CORPORATION, OF NEW YORK, N. Y., A CORPORATION OF DELAWARE

FINELY DIVIDED FUEL BURNING FURNACE

Application filed January 3, 1929. Serial No. 330,017.

This invention relates to finely divided fuel burning furnaces and is especially useful in the burning of low volatile fuels having high melting point ash, although the invention also has advantages in the burning of high grade fuels and fuels having low melting point ash.

One of the primary objects of our invention is the provision of an improved furnace adapted to take advantage of the slagging characteristics of the refuse in a manner that the effectiveness of the furnace is increased.

Another object of our invention is the provision of a novel slag retaining bottom for furnaces.

A further object of our invention is the provision of what may be termed an improved slagging furnace in which, among other things, operating difficulties are minimized.

Still another object has to do with the manner of admitting fuel and air into furnaces of the character described.

A still further object is the provision of improvements in the combustion chamber of furnaces of the slagging type.

A more specific object resides in the provision of a steam evaporating slag retaining bottom for combustion chambers.

How the foregoing, together with such other objects and advantages as may hereinafter appear, or are incident to our invention, are realized, is illustrated in preferred form in the accompanying drawings, wherein—

Fig. 1 is a sectional elevation of a furnace and boiler embodying our invention, certain parts being more or less diagrammatically illustrated and others being broken out for the sake of clarity.

Fig. 2 is a fragmentary cross section taken on the line 2—2 of Fig. 1.

Fig. 3 is a diagrammatic view of the lower furnace portion of a modification.

Fig. 4 is a fragmentary diagrammatic sectional elevation of the furnace portion of another modification of the invention.

Fig. 5 is a view similar to Fig. 3 of still another modification.

Figs. 6, 7 and 8 are diagrammatic views of the lower furnace portions of still other modifications.

Fig. 9 is a fragmentary sectional elevation of a modified burner arrangement.

Fig. 10 is a face view of Fig. 9.

Fig. 11 illustrates a modified form of furnace bottom, and

Fig. 12 is a diagrammatic plan view illustrating a modified form of firing.

Figure 7:
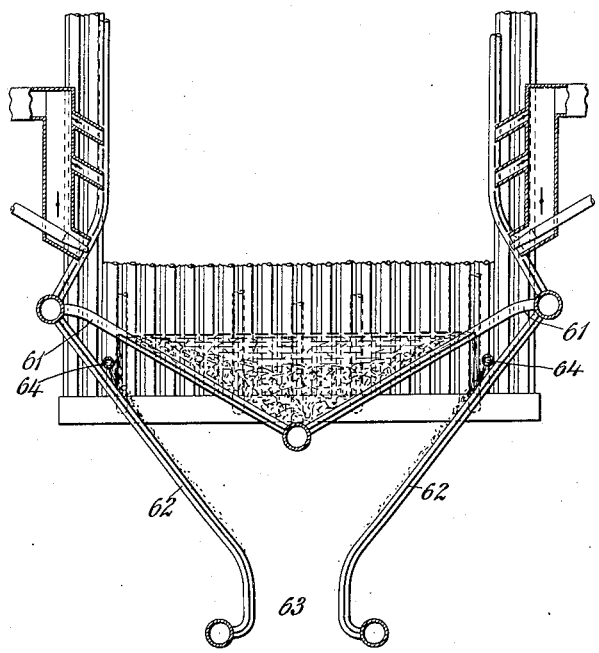

Referring now more particularly to Figs. 1 and 2, the arrangement therein shown comprises, in general, a furnace having a combustion chamber A and burner means B for introducing finely divided fuel (such as pulverized coal), and air into the combustion chamber; and a tubular boiler C associated with the combustion chamber, which boiler, in this instance, is of the horizontal type and arranged directly above the combustion chamber.

The upright walls of the combustion chamber are lined with steam evaporating tubes and steam evaporating tubes also provide a slag retaining bottom D for the chamber. As illustrated in Figs. 1 and 2 a row of tubes 12 line the front wall of the chamber. The tubes of this row connect at their upper ends into the header 13 and at their lower portions they angle inwardly and downwardly for connection into the lower header 14 located centrally of the combustion chamber.

The rear wall is lined by a similar row of tubes 15, the tubes of which connect at their upper ends into the header 16 and at their lower ends these tubes angle inwardly and downwardly for connection into the header 14.

The side walls of the combustion chamber, only one of which appears in the drawings, are each lined with a row of tubes 17, the tubes of which at their upper and lower ends are connected into the upper header 18 and lower header 19 respectively. The tubes of the aforesaid rows are preferably finned, it being noted that the fins of the front row are interrupted to provide openings for the introduction of fuel and air into the combustion chamber. The rows of wall tubes are backed by sheathing material.

Suitable upcomer and downcomer connections are provided for the steam evaporating walls, and, in this instance, we have provided a plurality of downcomers 20 leading from the water space of the boiler cross drum 21 to the lower header 14, a plurality of downcomers 22 leading from the drum 21 to the lower header 19 of one side water wall, a plurality of similar downcomers 23 leading to the lower header of the other side wall, and a plurality of sets of upcomers 24, 25, 26 and 27 leading from the upper header 13, 16, 18, 18, respectively, to the steam space of the drum 21. Thus the circulation in the tubes defining the bottom, front, and rear of the combustion chamber is upward from the lower header 14 to the upper headers 13 and 16 and from thence to the drum 21, and the circulation in the tubes of the side walls is upward from the lower headers 19 to the upper headers 18 and from thence to the drum 21.

The lower portions of the tubes of the walls 12 and 15, i. e., the portions thereof which extend inwardly and downwardly, form a slag retaining hopper shaped bottom for the combustion chamber, and the tubes are so spaced that the fins thereof substantially abut, it being pointed out, however, that I also contemplate providing such a bottom without the use of fins, in which case the tubes will be spaced sufficiently close to prevent the ash from falling freely through the spaces between the tubes.

In the operation of the furnace, ash or slag builds up in the bottom to form a relatively thick bed of slag 28, and we propose to impinge flames directly on the surface of this bed whereby to maintain a pool of liquid slag at the upper portion of the slag bed, the pool being kept at a constant level by continuously tapping off molten slag through the overflow outlet or outlets 29.

The burner means B illustrated in Fig. 1 comprises an air casing 30, to which air, preferably preheated air under pressure, is led by means of a conduit 31, a plurality of air nozzles 33, 34 and 35, and a pulverized fuel nozzle 36. The fuel nozzle 36 is associated with the air nozzle 33 in such manner that the fuel with its carrying air is surrounded with air discharging from the nozzle 33. The air nozzle 33 and the fuel nozzle 36 are inclined in a direction to direct the fuel and flame toward the bed of slag, thereby causing flame impingement on the slag bed. To further assist in bringing about such impingement the air nozzles 34 and 35 are also inclined downwardly so that their air streams act to spread the flame over the surface of the slag bed and to keep the flame in contact with said slag bed.

In order to control the character of the flame a damper 37 controls the supply of air through the nozzle 33 and dampers 38 and 39 control the supply of air through the nozzles 34 and 35, respectively.

Thus the air supply may be controlled in a manner that relatively high temperatures may be developed in the slagging zone, with the result that ash of high fusion point may be effectively melted down, i. e., effective slag liquefying temperatures may be maintained. To this end less air may be supplied with the fuel than that required for its complete combustion in order that such a reducing atmosphere immediately adjacent the slag bed as will result in minimum melting point of the slag may be provided as desired. The air injected above the fuel nozzle, preferably at high velocity, constitutes the balance required to complete combustion.

With the hot bottom described, ordinarily operating difficulties might be expected, particularly when the boiler is being forced to high rates of firing because of molten slag particles being carried upwardly in suspension to the boiler, with the result that the particles will stick to the tubes of the boiler building up deposits choking the gas passages. This, according to our invention, is largely overcome by the fact that the walls of the combustion space are composed of bare tubes subject to radiant heat and absorbing heat at a high rate, in consequence of which they tend to lower furnace temperature, especially in the upper regions of the combustion space, producing what may be termed a relatively cold top. This end is furthered by the fact that the additional air required for combustion is supplied at a level above the slagging zone and by the fact that such air is preferably admitted at high velocity which tends to produce thorough mixing, not only of the unconsumed combustibles with such air, but also the mixing of the hotter gases with the relatively cooler gases at the margins of the combustion space produced by the cooling effect of the bare tubes. This thorough mixing of the relatively cooler gases with the relatively hotter gases has a tendency to reduce furnace temperature in the region above the slagging zone. As the gases rise and become cooler by reason of the high rate of heat absorption of the bare walls, some shrinkage in volume takes place which reduces the velocity of the gases in the upper region of the combustion space and tends to make this region more effective as a cooling region or " cold top " in passing through which the slag particles are cooled to a point where sticking of the slag particles to the boiler tubes is greatly minimized. As a further means for securing the cold top an extra row of tubes c may be placed in advance of the boiler proper to act as a cooling screen.

While we have described but one set of air and fuel nozzles in the above, it is to be understood that a plurality thereof may be employed. In Fig. 3, for example, we have illustrated a furnace fired from two sides which makes for effective spreading and mixing of the flame.

Referring now to Fig. 4, it will be seen that an arch portion 40 is provided which extends into the combustion chamber at the lower portion thereof just above the slag bed. This arch portion is formed of a row of tubes 41 inclining inwardly and downwardly from the upper portion of the combustion chamber to a point relatively near the bottom and then inclining downwardly and outwardly. At their upper ends the tubes of the row 41 are connected into the outside header 42 and at their lower ends they are connected into the outside header 43. The arrangement of the row of tubes 15 and the side rows 17 is the same as described in connection with Fig. 1. The right hand portion of the slag retaining bottom in this case is formed of a row of tubes 44, the tubes of which are connected at their lower ends into the header 14 and at their upper ends into the header 43. Downcomer and upcomer connections similar to those described in connection with Fig. 1 may be employed.

A burner or burners B' for introducing pulverized fuel and air similar to the burner means above described may be employed. The particular burner illustrated is supported by the arch 40 and comprises damper controlled air nozzles 45, 46 and 47 and a pulverized fuel nozzle or nozzles 48. The fuel nozzle 48 and the air nozzle 45 are directed downwardly so as to cause impingement of the flame against the slag bed, and the air nozzles 46 and 47 discharge horizontal air streams into the flame above the point of fuel introduction. The arrangement provides a combustion chamber enlarging toward its upper portion which results in slowing down the velocity of the products of combustion, and affording opportunity for complete combustion within the combustion space with negligible loss in combustibles. The bare tube radiant heat walls, because of their high rate of heat absorption, lower the temperature, and, this, together with the slowing down, causes the products of combustion to enter among the tubes of the boiler C at such temperature and velocity as will obviate gas stoppage difficulties in the boiler.

The modification illustrated in Fig. 5 discloses a double arch arrangement which provides a restricted throat 49 between the lower portion 50 and the upper portion 51 of the combustion chamber. The side walls are lined with steam evaporating tubes in a manner similar to that described in connection with Fig. 1. The arches are provided by rows of tubes 52 and 53 inclining downwardly and inwardly from the upper part of the combustion chamber to a point relatively near the slag bed where they extend vertically for a short distance to form the throat 49 and from thence they incline downwardly and outwardly to form the arch walls 54 and 55 which support the burners. Suitable upper and lower headers are provided for the tubes of the rows 52 and 53. The tubes 56 which form the slag retaining bottom are connected at their lower ends into the header 14 and at their upper ends into the lower headers of the rows 52 and 53.

The burners in this instance admit downwardly and inwardly directed streams of fuel and air at 57, downwardly and inwardly directed air streams at 58 and inwardly directed streams of air at 59 and 60.

The arrangement secures direct flame impingement which can be controlled by manipulation of the air nozzle dampers as before described. The expanding chamber above the throat, together with the cooling effect of the tubular walls thereof, are conducive of the advantages hereinbefore set forth in this connection.

The modification shown in Fig. 6 is very similar to that of Fig. 5, it being pointed out that the arches are flatter and that the nozzles delivering through the arches are more nearly vertically disposed. Also a substantial amount of air is introduced into the throat 49 so as to insure complete combustion above the zone of slag.

In Fig. 7 a modification is illustrated in which the slag bed is automatically maintained at a predetermined level and is allowed to overflow through the spaces between the bottom forming tubes 61. The overflow drops onto the inclined cooling tubes 62 which have the effect of granulating the overflowing slag for ready removal through an ash discharge opening 63. Cooling jets such as water jets 64 may be directed toward the overflowing slag.

Figure 8:
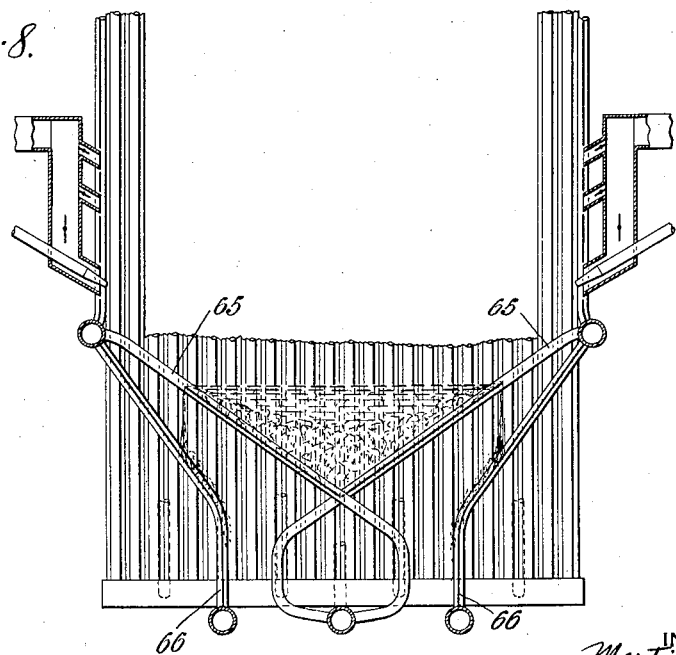

Fig. 8 illustrates a modification which is very similar to Fig. 7 with a difference appearing in the arrangement of the bottom forming tubes 65 and the cooling tubes 66, the arrangement providing a double discharge for the granulated slag.

In Figs. 9 and 10 we have illustrated a modified form of burner arrangement.

In Fig. 11 we have illustrated a furnace bottom in which the bottom forming tubes 67 are lined with a layer of refractory material 68 to which solidified slag adheres as indicated at 69. Above the solidified slag a viscous slag is formed as indicated at 70, and above this is the pool 80 of liquid slag.

In Fig. 12 we have illustrated diagrammatically an arrangement of fuel nozzles for tangential firing which may be employed with any of the furnace arrangements above described. We also contemplate arranging the air nozzles tangentially to cause a whirling action.

With this type of firing there would be a tendency to bring rising slag particles toward the walls, in consequence of which many of them would drop back, particularly in arrangements where there is restriction above the slag bed. In all of the arrangements with this type of firing, there would be a tendency to minimize the amount of slag particles reaching the boiler.

From the foregoing it will be seen that we have provided a furnace of a type which may be termed a slagging furnace and in which a novel arrangement of slag retaining bottom is employed.

The invention is one whereby low volatile coals may be successfully used in furnaces having the walls of their combustion chambers lined with water tubes and whereby the efficiency of such furnaces may be increased when firing with high volatile coals. It is pointed out that it has heretofore been impossible to obtain good combustion in such furnaces, except when firing with coal of very high volatile content, and even then the carbon loss was apt to be high. This is because of the great reduction in temperature brought about by the rapid heat absorption of the walls.

We so introduce our flame that slag liquefying temperatures are produced at the slag bed so that the white hot bath of slag radiates heat back toward the burners and causes early ignition and effective combustion. Due to the impinging action of the flame the air can be reduced with the result that the furnace temperature is raised and slag liquefying temperatures maintained. By introducing air at high velocity above the slagging zone complete combustion of the combustible gases liberated in the slagging zone is ensured with turbulence of flame securing complete combustion notwithstanding the high rate of heat absorption of the radiant heat walls.

By maintaining a body of liquid slag, the combustible particles driven thereinto are consumed because, among other things, of the difference in specific gravity by virtue of which said particles rise through the liquid slag bath. For example coal particles which fall into the liquid slag rise to the surface and meet with oxygen and are consumed. Similarly any gases liberated within the bath of course rise therethrough and enter the combustion chamber and are there consumed.

In order to prevent "running through" of molten slag through the spaces between the bottom forming tubes or thru the refractory on such tubes, we operate with a slag bed of sufficient depth under all conditions of service sufficient to prevent the whole bed, vertically considered, from becoming molten.

We claim:—

1. In a pulverized fuel fired furnace, the combination of a combustion chamber, steam evaporating tubes largely defining said chamber and including relatively closely spaced steam evaporating tubes defining a bottom for the chamber constructed and arranged to retain a stagnant bed of slag, means for introducing the fuel with carrying air into said chamber, and air nozzles for introducing additional air into the chamber, said fuel introducing means being directed toward the bed of slag retained in the bottom of the chamber.

2. In a pulverized fuel fired furnace, the combination of a combustion chamber, steam evaporating tubes largely defining said chamber and including relatively closely spaced steam evaporating tubes defining a bottom for the chamber constructed and arranged to retain a stagnant bed of slag, a fuel introducing nozzle directed toward the bed of slag, an air nozzle directly associated with the fuel nozzle for admitting air with the fuel, and other air nozzles for admitting additional air into said chamber.

3. In a pulverized fuel fired furnace, the combination of a combustion chamber, steam evaporating tubes constituting the bottom of the combustion chamber, said tubes being constructed and arranged so as to retain stagnant bed of slag in the chamber, and means for introducing fuel and air into said chamber in a manner to cause flame impingement against said bed.

4. In a pulverized fuel fired furnace, the combination of a combustion chamber, steam evaporating tubes forming a bottom for the chamber and constructed and arranged to retain a stagnant bed of slag, and means for introducing pulverized fuel and air into said chamber in a manner to produce slag liquefying temperature at the surface of the retained slag, together with overflow means for maintaining the slag at a predetermined level.

5. In a pulverized fuel fired furnace, the combination of a combustion chamber, exposed steam evaporating tubes lining the walls of said chamber, exposed steam evaporating tubes marginal of the bottom of the combustion chamber forming a bottom for the chamber and constructed and arranged to retain a stagnant bed of slag, and means for introducing pulverized fuel and air into the combustion chamber in a direction to produce slag liquefying temperature at the surface of the retained slag.

6. In a pulverized fuel fired furnace, the combination of a combustion chamber, steam evaporating tubes forming a slag retaining bottom for the chamber, steam evaporating tubes forming an arch wall in the lower portion of the chamber, and means for introducing pulverized fuel and air into said chamber through the arch wall in a direction inwardly and downwardly toward the retained slag, said arch tubes being spaced to provide openings for such introduction of the fuel and air.

7. In a pulverized fuel fired furnace, the combination of a combustion chamber, steam evaporating tubes forming a slag retaining bottom for the chamber, means for introducing pulverized fuel and air into said chamber in a manner to produce slag liquefying temperature at the surface of the slag including an air casing having a plurality of air nozzles discharging into the chamber through openings in the furnace located adjacent the bed of retained slag, and a pulverized fuel nozzle associated with an air nozzle for delivering fuel into the chamber, said nozzles being directed downwardly toward the slag.

8. In a pulverized fuel fired furnace, the combination of a combustion chamber, steam evaporating tubes forming a slag retaining bottom for the chamber, means for introducing pulverized fuel and air into said chamber in a manner to produce slag liquefying temperature at the surface of the slag including an air casing having a plurality of air nozzles discharging into the chamber through openings in the furnace located adjacent the bed of retained slag, and a pulverized fuel nozzle associated with an air nozzle for delivering fuel into the chamber, said nozzles being directed downwardly toward the slag together with damper means for controlling the admission of air.

9. In a pulverized fuel fired furnace, the combination of a combustion chamber, steam evaporating tubes forming a slag retaining bottom for the chamber, means for introducing pulverized fuel and air into said chamber in a manner to produce slag liquefying temperature at the surface of the slag including air and fuel nozzles discharging into the chamber through openings in the furnace located adjacent the slag bed and at different heights, said fuel nozzles discharging through the lowermost of said openings and being directed toward the slag bed.

10. In a pulverized fuel fired furnace, the combination of a combustion chamber, a slag retaining bottom for said chamber, steam evaporating tubes defining the combustion space of the furnace including tubes forming a restricted portion intermediate the top and bottom of the combustion space, means for admitting pulverized fuel and air into the portion of the space below the restriction, and means for admitting air above said portion, said first mentioned means being so disposed as to direct the fuel and air admitted thereby toward the retained slag.

11. In a pulverized fuel fired furnace, the combination of a combustion chamber having a slage retaining bottom, a double arch in said chamber dividing the chamber into an upper and lower combustion space connected by a restricted throat, means for introducing pulverized fuel and air into the lower space in a direction toward the retained slag, and means for admitting air above said lower space to further combustion.

12. In a pulverized fuel fired furnace, the combination of a combustion chamber having a bottom constructed and arranged to retain a stagnant bed of slag, steam evaporating tubes lining walls of the chamber, steam evaporating tubes inclined into the chamber to provide a double arch in the lower portion of the chamber and dividing the chamber into a lower combustion space and a relatively large upper space, means for introducing pulverized fuel and air into the lower space and means for introducing air thereabove to complete combustion in the upper space.

13. In a pulverized fuel fired furnace, the combination of a combustion chamber, steam evaporating tubes in the bottom portion of the chamber forming a slag retaining bottom, an overflow opening located at a level above the bottom for the overflow of liquid slag when the bottom is filled to the level of said opening, and cooling tubes associated with said bottom to cool the overflow, and means for introducing pulverized fuel and air into said chamber in a manner to liquefy the retained slag.

14. In a pulverized fuel fired furnace, the combination of a combustion chamber, steam evaporating tubes forming a bottom for the chamber constructed and arranged to retain a stagnant bed of slag, and means for introducing pulverized fuel and air into said chamber including a pulverized fuel nozzle located adjacent the slag bed and arranged to direct the fuel toward said slag bed, and an air nozzle for introducing combustion air into said chamber, the air nozzle being so disposed as to admit the major portion of the air above the point of fuel introduction.

15. A furnace having a bottom constructed and arranged to retain a stagnant body of slag, burner means for delivering pulverized fuel to impinge on said body, means for supplying a quantity of combustion air such as to produce a reducing atmosphere adjacent said body and means thereabove for introducing the additional air required for combustion.

16. A furnace having a bottom constructed and arranged to retain a stagnant body of slag, tangentially arranged burner means for delivering pulverized fuel adjacent said body and tangent to an imaginary circle within the furnace, the axis of which is approximately vertical, means for supplying a quantity of combustion air such as to produce a reducing atmosphere adjacent said body and means above the slag bed to maintain the upper portion of the chamber relatively cool.

17. A furnace having a bottom constructed and arranged to retain a stagnant body of slag, burner means for delivering pulverized fuel adjacent said body, means for supplying a quantity of combustion air such as to produce a reducing atmosphere adjacent said body and means thereabove for introducing the additional air required for combustion.

18. In a slag bottom pulverized coal burning installation, the combination of a combustion chamber, means for introducing coal and air thereinto, and steam evaporating tubes forming a bottom for the chamber and constructed and arranged to retain a stagnant bed of slag and to cool the bed of slag at all of its edges.

19. In a pulverized fuel fired furnace, the combination of a combustion chamber, steam evaporating tubes and a lining therefor constituting the bottom of the combustion chamber, said tubes and lining being constructed and arranged so as to retain a stagnant bed of slag in the chamber and to cool said bed at all of its edges and means for introducing fuel and air into said chamber in a manner to produce slag liquefying temperature at said bed of retained slag.

20. In a furnace having a combustion chamber the bottom of which is constructed and arranged to retain a stagnant body of slag, the combination of steam evaporating tubes arranged in surrounding relation to said bottom with bare portions thereof above the level of the body of slag exposed thereto to have cooling effect at the entire periphery of the body, and means for introducing pulverized fuel and air into said chamber.

21. In a pulverized fuel fired furnace, the combination of a combustion chamber having a bottom constructed and arranged to retain a stagnant bed of slag, upright bare steam evaporating tubes located in said chamber at the entire periphery of the retained slag, and means for introducing pulverized fuel and air into said chamber.

22. A furnace having a combustion chamber the bottom of which is constructed and arranged to retain a stagnant bed of slag, upright bare steam evaporating tubes located in said chamber and exposed for the absorption of heat to the body of slag at the entire periphery thereof, and pulverized coal burners arranged to direct coal streams into the furnace adjacent the body of slag and tangent to a circle to produce a vortical flame sweeping the body of slag, the axis of which is approximately vertical.

In testimony whereof we have hereunto signed our names.

MARTIN FRISCH.
ERIC LUNDGREN.